United States Patent [19]

Greenblatt

[11] Patent Number: 4,496,943
[45] Date of Patent: Jan. 29, 1985

[54] PORTABLE INFORMATION DISPLAY

[75] Inventor: Richard W. Greenblatt, Passaic Park, N.J.

[73] Assignee: Portable Terminal Corp., Passaic Park, N.J.

[21] Appl. No.: 442,544

[22] Filed: Nov. 18, 1982

[51] Int. Cl.³ .............................................. G09G 1/00
[52] U.S. Cl. .................................... 340/711; 340/700; 179/2 DP; 364/708
[58] Field of Search ................... 340/711, 700, 825.19, 340/825.28, 825.29, 825.55; 179/2 DP, 2 C, 2 TV; 364/188, 189, 708, 709, 710; 358/85

[56] References Cited

U.S. PATENT DOCUMENTS

| | | | |
|---|---|---|---|
| 3,071,753 | 1/1963 | Fritz et al. | 340/825.29 |
| 3,484,748 | 12/1969 | Greenblum et al. | 340/825.28 |
| 3,582,904 | 6/1971 | Bradwein . | |
| 3,588,838 | 6/1971 | Felcheck . | |
| 3,819,862 | 6/1974 | Hedges | 340/825.29 |
| 4,007,443 | 2/1977 | Bromberg et al. | 340/711 |
| 4,125,871 | 11/1978 | Martin . | |
| 4,143,360 | 3/1979 | Bernhart et al. . | |
| 4,150,254 | 4/1979 | Schussler et al. | 179/2 TV |
| 4,203,107 | 5/1980 | Lovercheck . | |
| 4,234,933 | 11/1980 | Adelson et al. . | |
| 4,258,387 | 3/1981 | Lemelson et al. | 179/2 C |
| 4,268,721 | 5/1981 | Nielson et al. | 179/2 DP |
| 4,291,198 | 9/1981 | Anderson et al. | 179/2 DP |
| 4,333,097 | 6/1982 | Burie et al. | 340/711 |
| 4,451,701 | 5/1984 | Bendig | 179/2 TV |

OTHER PUBLICATIONS

*Electronics Industry*, "Alphanumeric Adaptor Allows Low-Cost Viewdata Access", May 1982, pp. 11-15.

*Primary Examiner*—Gerald L. Brigance
*Attorney, Agent, or Firm*—Nolte, Nolte and Hunter

[57] ABSTRACT

A portable information display system, corresponding generally to a computer "terminal", employs a compact embodiment of a size to fit under a typical airline seat. Subassemblies including a modem, a power supply, a cathode ray tube, a protocol convertor, and a keyboard are specifically arranged inside the housing to permit optimal operation in minimal volume.

4 Claims, 3 Drawing Figures

PORTABLE INFORMATION DISPLAY

BACKGROUND OF THE INVENTION

The present invention relates to information and display systems or terminals and, specifically, relates to portable terminals having visual displays and keyboards contained within a package easily transportable by a single person.

Technological advances in the computer industry and in computer related instruments have caused the overall size of many computing systems to be decreased drastically. Indeed, the fact that the computers can be of such a small size has added much to their marketability. Along with the reduction in size of the computer has also come the proliferation of small "terminals". The overall dimensions of such small terminals have also been reduced substantially and now are generally desktop size. These so-called "portable" terminals typically employ a cathode ray tube (CRT), a keyboard, one or more disc drives for accepting the software that permits the terminal to emulate the system with which it communicates, and a relatively small amount of local storage.

There are presently two main kinds of CRT terminals, one of which runs on or "talks to" IBM mainframe computers, such as the IBM 360/370 and 3000/4300 series. These are known as 3270 terminals. The second kind of CRT terminals run on or talk to mainframe computers or minicomputers made by other manufacturers. This second kind of terminal is generally referred to as an ASCII terminal, which is an acronym for American Standard Code for Information Interchange.

The CRT terminal is typically used in combination with the appropriate software, via the disc drive, to permit the terminal to emulate the specific host computer. This emulation is based upon the particular protocol used by the computer. Integral with this protocol compatibility is the data communication methodology that is employed. The original data communications protocol used by the 3270 terminals is known as binary synchronous communications (BSC) or bisynch. A more recent IBM data communication methodology is known as Systems Network Architecture/Synchronous Data Link Control (SNA/SDLC). Therefore, the terminal selected by the user must be compatible with the data communication methodology of the main computer. In that regard, there are now available devices known as "protocol convertors" to meet either the bisynch or SNA/SDLC standard. Thus, many present terminals are actually user-programmed microcomputers requiring a controller to meet the various protocols.

The trend then in this kind of computer support equipment is toward more and more compatibility in these terminals and, along with this, go increases in system complexity, cost, and size. While being loosely referred to as "portable", these presently available terminals have gotten heavier and more difficult to transport and, in all events, are not portable in the sense that they may be easily transported from one location to another by a single person, e.g., by public transportation, such as being placed under an airline seat.

SUMMARY OF THE INVENTION

The present invention teaches a completely portable information display system that corresponds generally to a computer "terminal" but involves a compact embodiment of a size to fit under a typical airline seat. The preferred embodiment involves a 3270 interactive bisynchronous device. The invention employs subassemblies, such as a modem, a power supply, a cathode ray tube display, a main circuit board or converter, and a keyboard specially arranged within a housing of a size and configuration for portable use. Because the present invention is intended to be an information display system, disc drives are eliminated in the present construction and no software emulation is intended. Nevertheless, through the use of internal firmware the present invention is capable of operating under various protocols, e.g., Bisynch, and SNA/SDLC. The invention is intended for connection through conventional voice-grade telephone lines to a computing facility and employs an on-board modem within the housing. The preferred embodiment also provides a video output signal, as well as a printer output signal, to drive different displays or hard-copy printers.

The invention is made up of "off the shelf" subassemblies chosen in such a way that no performance benefits are sacrificed, yet all of these subassemblies can be optimally arranged within a small housing with a resultant low overall weight.

The arrangement of the various subassemblies employed in the present invention inside the portable-sized housing is such to preclude any heat or insulation problems, which would ultimately degrade performance, as well as to minimize internal inductance and EMI problems.

Accordingly, it is an object of the present invention to provide a portable 3270 information display system for communicating with a main computer via voice-grade telephone lines, employing off-the-shelf subassemblies, including an internal modem, and being arranged in a housing of a size/weight configuration suitable for portable use.

The manner in which this and other objects are accomplished by the present invention will be seen in the following description.

DETAILED DESCRIPTION OF THE INVENTION

Figure 1:
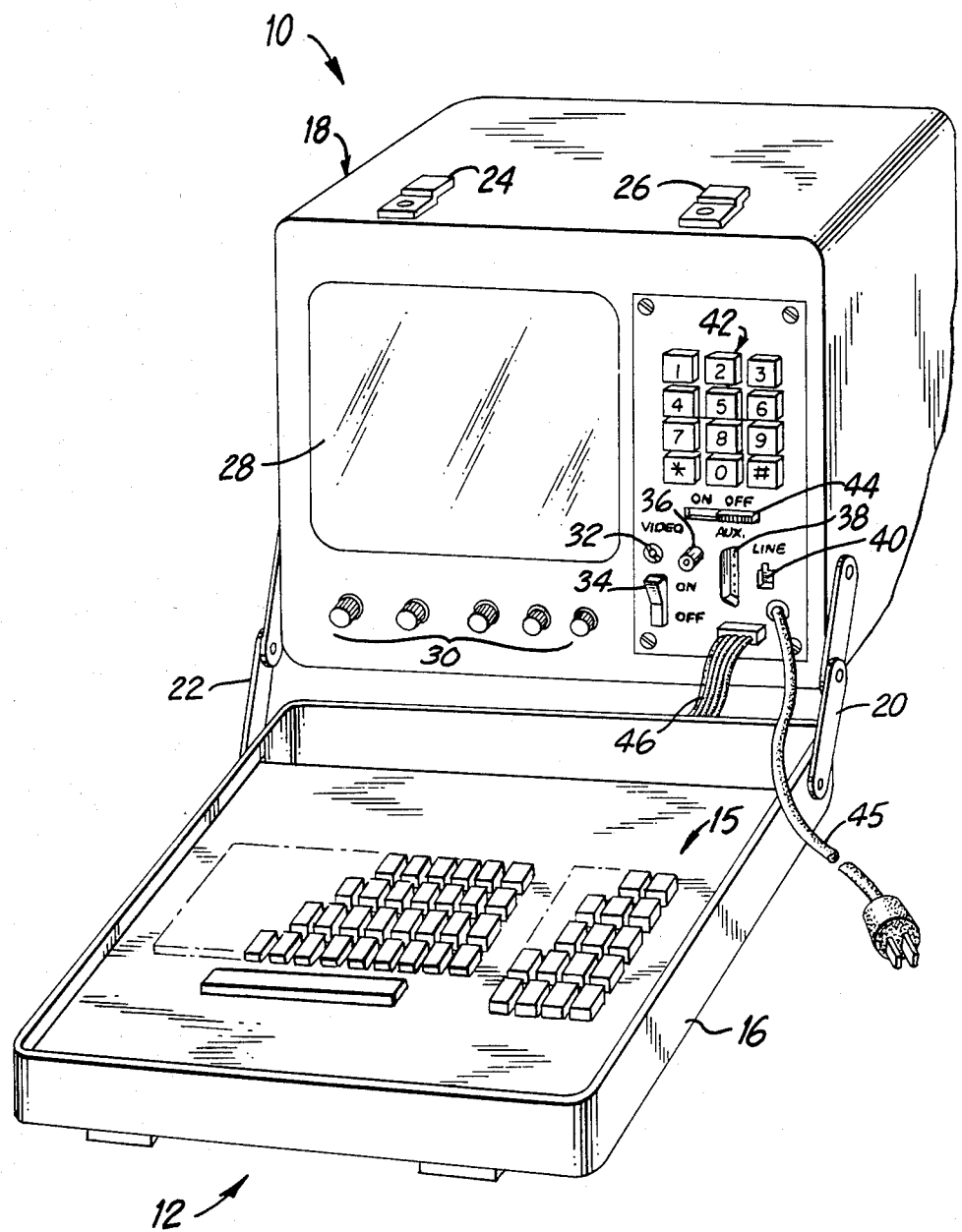
FIG. 1 is a perspective of the inventive unit showing the display tube, the keyboard, and external connections.

Referring now to FIG. 1, the inventive assembly 10 is shown opened up, so as to place the unit in an operable position. Specifically, the keyboard assembly, shown generally at 12, comprises a standard electric typewriter keyboard section 14 and a standard key pad section 15 contained within a metal housing or shell 16 that forms the lid of the unit 10. The lid 16 is hingedly affixed to the main housing 18 of the unit via two hinges 20, 22 and can be fastened to the outer housing 18 by luggage-type clips 24, 26. The main functional elements of the present invention, which will be discussed in detail hereinbelow, are mounted inside housing 18. A conventional carrying handle (not shown) may be affixed to the center of lid 16.

The front of the unit 10 includes a cathode ray tube 28 that provides the visual display to the operator. The conventional CRT controls are shown typically at 30. A standard coaxial cable jack 32 provides video output signals for use at a remote or auxiliary display. Also, on the front of the unit is the standard on/off switch 34, as well as line current overload protection in the form of a fuse 36. An auxiliary output jack 38, shown as a standard D-type connector, provides a means for electrical connection to a printer (not shown), thereby permitting the present invention to provide a hard-copy print out, as well as the visual display on the cathode ray tube 28. A modular phone jack 40 connects the modular plug of a voice-grade phone line to the modem of the inventive unit. A twelve key touch tone panel 42 and on/off switch 44 are arranged on the front of the unit. This phone key panel permits phone line dialing once the unit is connected to the computer via the modem. This key panel 42 may not always be required and, if not, a jack may be provided for connection of a push button handset having an on/off switch. The power cord 45 enters the unit at the front panel, so that once the lid 16 is closed and fastened to the housing 18, nothing protrudes from the unit. The keyboard assembly 12 is connected to the electronics of the main unit by a flexible ribbon cable 46.

Figure 2:
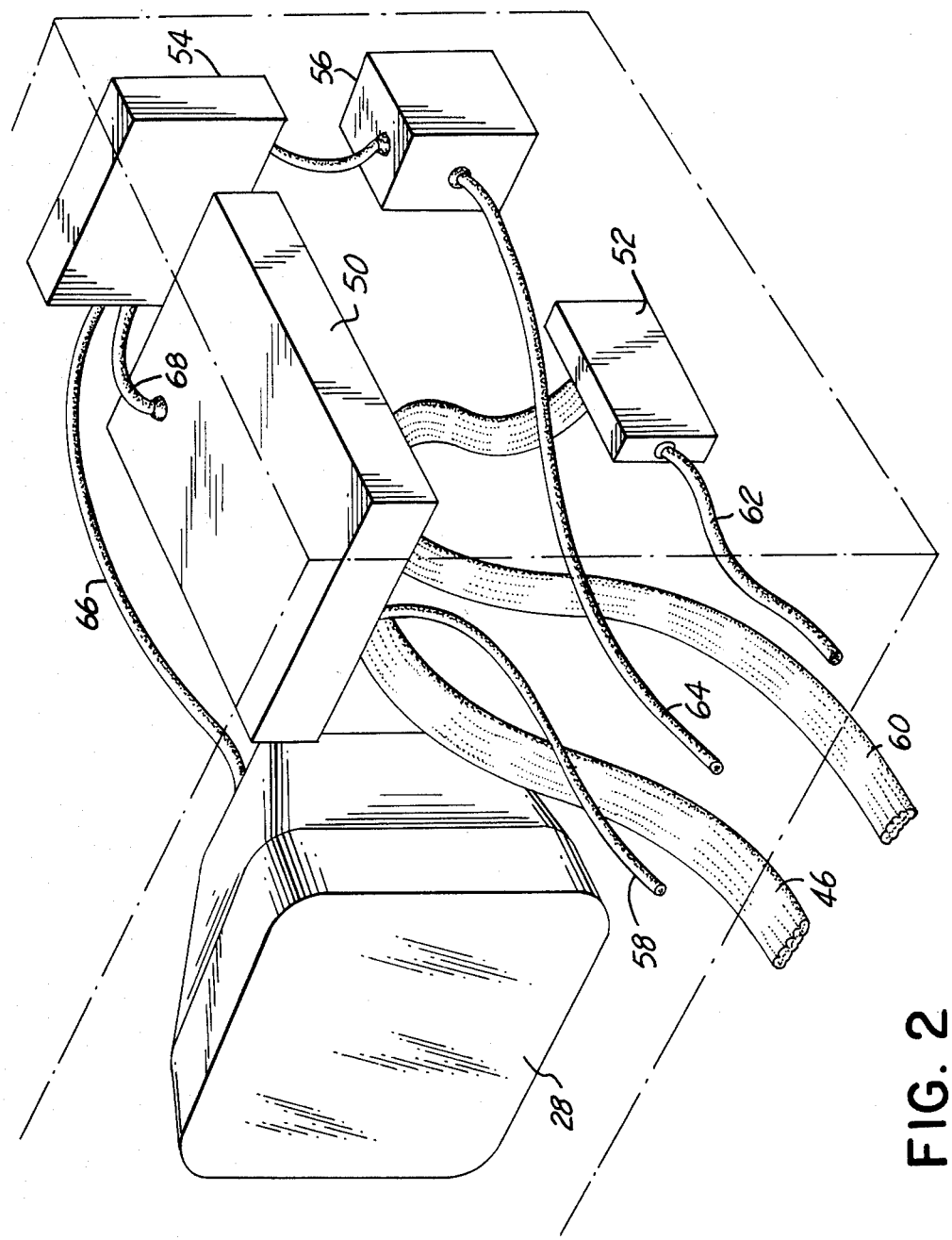
FIG. 2 is a perspective of the inventive unit showing the inside thereof in partial schematic form.

In FIG. 2, the functional subassemblies of the invention are shown arranged inside the metal housing 18 that is of a size and configuration for portable use. The front control panel has been removed in the view of FIG. 2 to show the interior arrangement of these subassemblies.

The present invention teaches a display terminal that specifically must be portable and, therefore, teaches the avoidance of the software emulation approach. This then permits the elimination of all the hardware and electronics that are required by a disc drive. The present invention requires only certain subassemblies, e.g., the cathode ray tube 28, a main circuit board 50 or convertor that provides the necessary protocol conversions to permit 3270 data communications, a modem 52, and a power supply 54 that includes a power transformer 56. By carefully choosing these subassemblies, and by eliminating the disc drive needed for software emulation, the invention teaches the arrangement of all necessary subassemblies inside a rigid housing 18 of a size to permit easy, single handed portability.

The video signal available at jack 32 on the front panel is fed to the jack by line 58 from the CRT 24. The printer connection available at jack 38 on the front panel is fed thereto by ribbon cable 60 that originates on the main circuit board 50, also termed the convertor. The ribbon cable 46 used to connect the keyboard unit 12 with the main unit emanates from the main circuit board 50. The connection to the voice-grade dial line is fed through the modular plug 32 to the modem 52 by line 62. The main circuit board 50 includes circuitry to accomplish the protocol data communication conversions, as well as the digital logic necessary to convert the information provided into a format for display on the CRT and to convert the keyboard information to display information. The main circuit board 50 is available from several sources, such as Local Data of Torrance, Calif. and Term-Tronics of Alexandria, Va. The power supply 54 is arranged against the rear wall of the housing and operates in conjunction with the power transformer 56 also affixed to the rear wall. The line current, as provided by the power cord 45, is fed to the transformer on line 64. The power supply 54 is connected to provide regulated voltages to the CRT 24 and the main circuit board 50, on lines 66 and 68, respectively.

Figure 3:
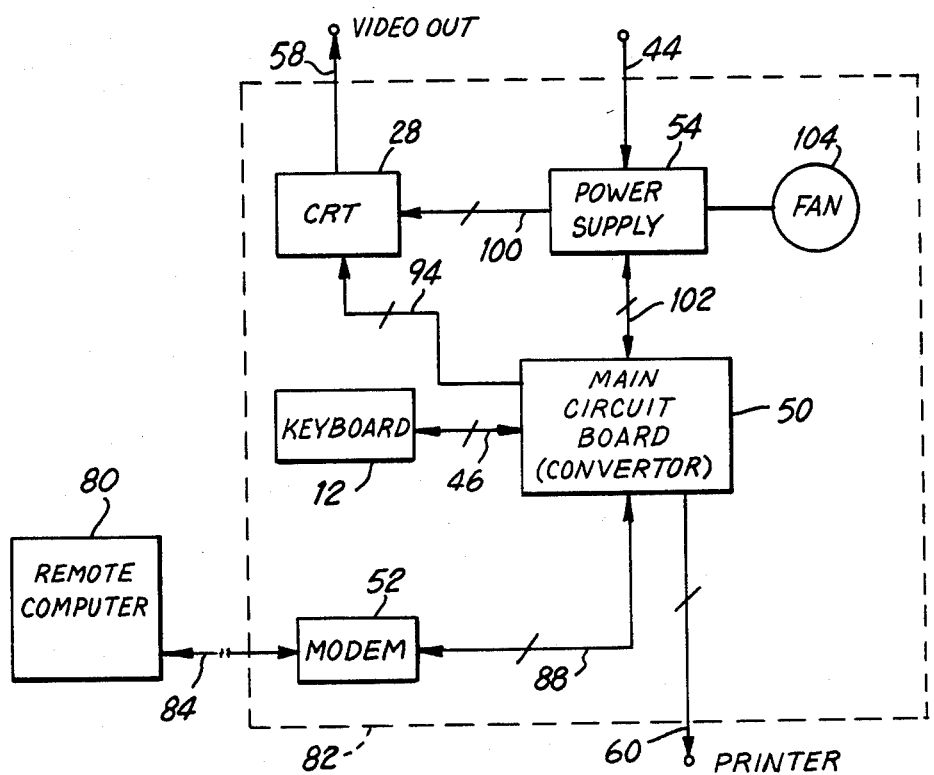
FIG. 3 is a block diagram showing the functional subassemblies of the present invention.

FIG. 3 shows the electrical interconnections between the basic functional elements of the present invention and, specifically, shows the mainframe computer 80 located at some remote site and interconnected with the present invention, as represented within dashed line 82, via voice-grade telephone lines 84. The telephone line 84 is connected to the modem 52 that is preferably selected to operate at between 110–96,000 Baud and is currently available from several manufacturers. The modem 52 is connected via multi-lines 88 to the main circuit board 50, which is itself connected via ribbon cable 46 to the keyboard 12. The cathode ray tube 28 is connected to the main circuit board 90 via multi-lines 94. The power supply 54 provides the proper voltages for both the cathode ray tube 28 on line 100 and the convertor 50 on line 102. The video out signal is fed out from the CRT 28 on line 58 and the printer drive signals are obtained from the main circuit board on multi-lines 60. Preferably, a small fan 104 is mounted in a side wall of housing 18 to cool all the subassemblies. The fan 104 is connected to be powered by the power supply 54.

It is understood that the foregoing is presented by way of example only and is not intended to limit the present invention, except in the appended claims.

What I claim is:

1. A self contained, lightweight, portable information display unit, without software and disc drive means, for providing communication only with a remote computer, employing known bisynchronous or synchronous, SNA, SDLC data communication protocol, over a voice grade telephone line, consisting only of;

a housing having two compartments connected by hinge means for pivoting said compartments to relative open and closed positions and including hand carrying means secured to a top portion of one of said compartments and being of a size and configuration for single-handed portability via said hand carrying means;

data communication converter means arranged within one of said housing compartments for converting signals only into a data protocol of the remote computer;

cathode ray tube display means arranged within said one of said housing compartments with the screen thereof arranged for displaying information when said compartments are in the open position and being electrically connected to said converter;

a manual keyboard arranged within the other of said housing compartments and electrically connected to said converter for providing input signals thereto, said keyboard facing said cathode ray tube display means when said compartments are in the closed position and positioned for use by an operator when said compartments are in the open position;

a modem arranged within said one of said housing compartments for modulating/demoduating signals fed to and from the remote computer;

a modular phone line connector mounted on said one of said housing compartments and connecting said modem and providing an external connection between said modem and telephone lines for sending signals to and receiving signals from the remote computer;

power supply means arranged within said one of said housing compartments and electrically connected to said display means and said converter and with an external source of power for providing predetermined levels of power to said display means and to said converter means;

said manual keyboard comprising a manual typewriter portion and a standard numerical keypad portion; and a ventilating fan is arranged in said housing and connected to said power supply for providing air circulation within the interior of said housing.

2. The unit of claim 1, wherein said modular phone line connector is a jack connection for a modular phone plug.

3. The unit of claim 2, further consisting of a second jack connection mounted on said one of said housing compartments and connecting said converter and providing an external connection between said unit and a printer.

4. The unit of claim 3 further consisting of a coaxial cable jack connection mounted on said one of said housing compartments and connecting said cathode ray tube and providing an external connection for a remote display means.

* * * * *